Nov. 24, 1942.  P. MEEHAN  2,302,787
ANIMAL EXTERMINATOR
Filed April 30, 1941  2 Sheets-Sheet 1

Inventor
Paul Meehan
By Clarence A. O'Brien
Attorney

Nov. 24, 1942. P. MEEHAN 2,302,787
ANIMAL EXTERMINATOR
Filed April 30, 1941 2 Sheets-Sheet 2
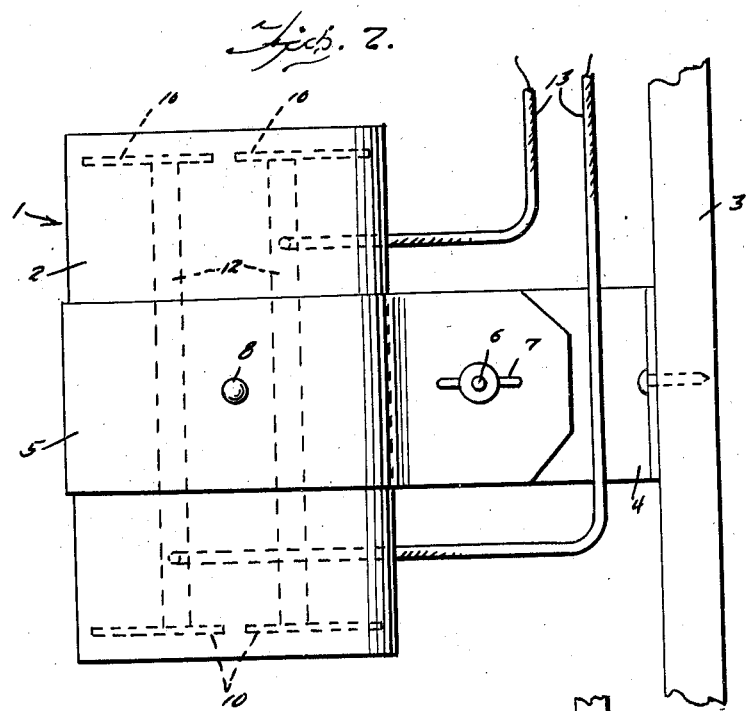
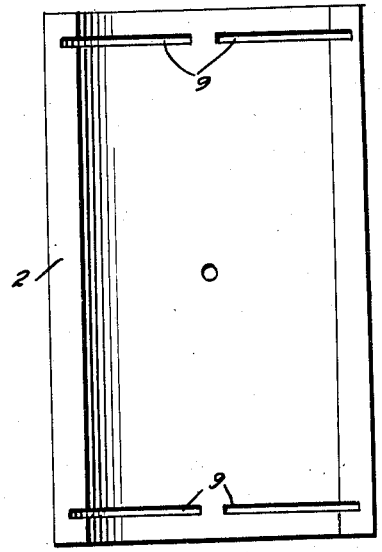
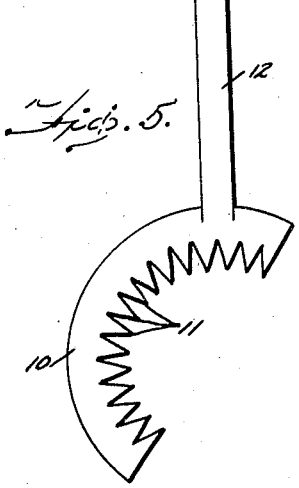
Inventor
Paul Meehan
By Clarence A. O'Brien
Attorney Patented Nov. 24, 1942

2,302,787

UNITED STATES PATENT OFFICE 2,302,787

ANIMAL EXTERMINATOR

Paul Meehan, St. Louis, Mo.

Application April 30, 1941, Serial No. 391,197

2 Claims. (Cl. 43—98)

The present invention relates to new and useful improvements in animal exterminators and has for its primary object to provide, in a manner as hereinafter set forth, a device of this character comprising novel means for killing rodents, weasels and other small animals of the pest or nuisance type by electrocution.

Another very important object of the invention is to provide an animal exterminator of the aforementioned character having contacts of a unique construction and arrangement whereby maximum efficiency in the functioning of the device will be assured.

Another important object of the invention is to provide an electric exterminator of the character described which may, if desired, be used for killing birds by electrocution.

Other objects of the invention are to provide an exterminator of the character set forth which will be comparatively simple in construction, strong, durable, highly efficient and reliable in use, compact and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 2 is a top plan view of the device.

Figure 4 is a plan view of one of the half sections of the tube or cylinder.

Figure 5 is a plan view of one of the toothed contacts.

Figure 6:
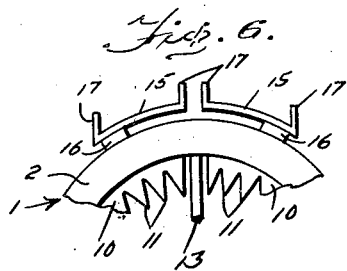
Figure 6 is a fragmentary view in end elevation, showing the device adapted for the killing of birds.
Figure 1:
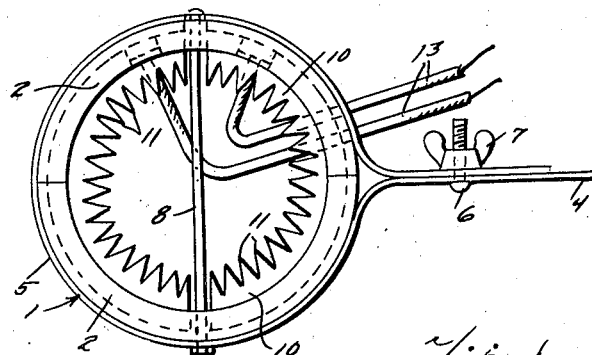
Figure 1 is a view in end elevation of an exterminator constructed in accordance with the present invention.
Figure 3:
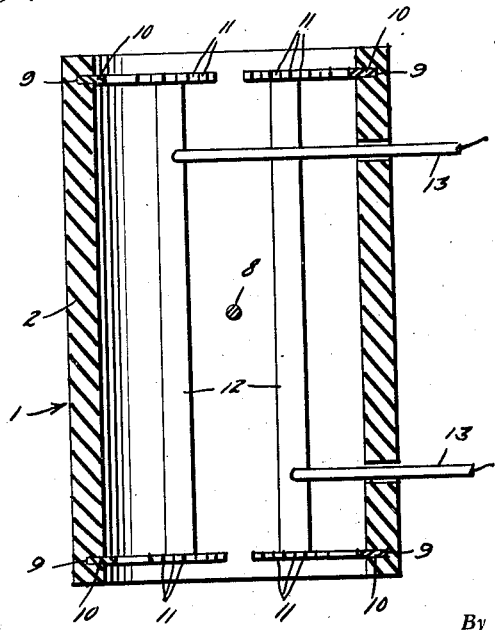
Figure 3 is a view in horizontal section through the device.

Referring now to the drawings in detail, it will be seen that reference numeral 1 designates generally a tube or cylinder of suitable insulating material, which cylinder may be of any desired length and diameter. The cylinder 1 includes a pair of complemental half sections 2. The cylinder 1 is mounted on a suitable support 3 through the medium of a bracket 4. The bracket 4 includes a split clamp 5 on one end which encircles the cylinder 1 and which is clamped therearound through the medium of a bolt 6 which is equipped with a wing nut 7. A bolt 8, which is mounted on the clamp 5, secures the sections 2 of the cylinder 1 together and also provides a post or support on which suitable bait may be mounted.

The cylinder 1 has formed in its end portions circumferentially extending segmental grooves or channels 9. The grooves 9 are for the reception of pairs of spaced, opposed segmental contacts 10. The contacts 10 are provided, on their inner edges, with pointed teeth 11 for assuring a good electrical connection with the feet of the animal entering the cylinder 1.

It will be observed that the construction and arrangement is such that the contacts 10 bridge the joints between the sections 2 of the cylinder 1. Integral conductor strips 12 connect the contacts 10 on the opposed sides of the cylinder 1. As suggested in Figure 5 of the drawings, the contacts 10 and the respective conductor strips 12 are stamped from a single sheet of suitable metal. Electric wires 13 from any suitable source of current enter the cylinder 1 and are connected to the conductor strips 12. If desired, a suitable electric signal may be interposed in the circuit for the purpose of indicating when said circuit is closed.

It is thought that the operation of the device will be readily apparent from a consideration of the foregoing. Briefly, the animal, attracted by the bait on the bolt 8, enters the cylinder 1 at either end. When the opposed contacts 10 or conductor strips 12 are bridged by the animal, thus closing the circuit, said animal is electrocuted. As hereinbefore indicated, the sharp teeth 11 assure good contact with the feet of the animal.

Figure 7:
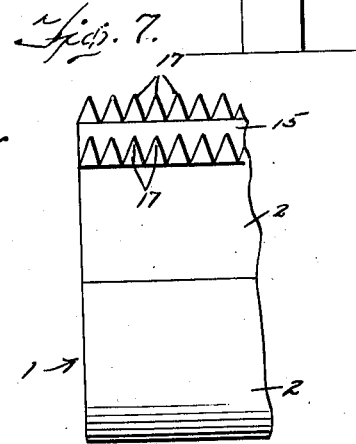
Figure 7 is a fragmentary view in side elevation of the embodiment shown in Figure 6.

In Figures 6 and 7 of the drawings, a pair of spaced contacts in the form of elongated strips 15 of suitable metal are mounted longitudinally on the cylinder 1 and insulated therefrom, as at 16. The elongated contacts 15 are of arcuate cross section and rising from the longitudinal edges thereof are sharp, integral teeth 17. This embodiment may be used in runways, on roofs, etc., for killing hawks, owls, pigeons and other birds.

It is believed that the many advantages of an exterminator constructed in accordance with the present invention will be readily understood and although preferred embodiments of the device are as illustrated and described, it is to be understood that further modifications and changes in the details of construction may be resorted to which will fall within the scope of the invention as claimed. For example, the cylinder 1 may be of resilient material and longitudinally split for mounting on ropes, etc., and any desired number of the elongated contacts 15 may be provided on said cylinder.

What is claimed is:

1. An exterminator of the class described comprising a cylinder of insulating material open at its ends for the entrance of an animal, said cylinder including complemental half sections, a bolt traversing the cylinder for securing the sections together and constituting a bait holder, said cylinder having circumferentially extending grooves in its end portions, and pairs of opposed electric contacts mounted in said grooves and adapted to be bridged by an animal entering the cylinder.

2. An exterminator of the class described comprising a cylinder of insulating material open at its ends, said cylinder having circumferentially extending grooves in its end portions, pairs of opposed electrical contacts mounted in said grooves, one contact of each pair being spaced from the other contact of the pair and strips extending along the inner surface of the cylinder with each strip connecting a contact at one end of the cylinder to an opposed contact at the opposite end thereof and conductors connecting such strips with a source of supply.

PAUL MEEHAN.